United States Patent
Cai et al.

(10) Patent No.: US 11,252,084 B1
(45) Date of Patent: Feb. 15, 2022

(54) ENHANCED SD-WAN PATH QUALITY MEASUREMENT AND SELECTION

(71) Applicant: Palo Alto Networks, Inc., Santa Clara, CA (US)

(72) Inventors: Chunqing Cai, Los Altos, CA (US); Philip Kwan, San Jose, CA (US); Lin Wang, Palo Alto, CA (US); Lei Chang, Saratoga, CA (US); Sameer Kumar, Cupertino, CA (US); Pulikeshi Ramanath, San Jose, CA (US); Santosh Narayankhedkar, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 17/037,403

(22) Filed: Sep. 29, 2020

(51) Int. Cl.
  *H04L 12/725* (2013.01)
  *H04L 45/30* (2022.01)
  *H04L 43/10* (2022.01)

(52) U.S. Cl.
  CPC ............ *H04L 45/306* (2013.01); *H04L 43/10* (2013.01)

(58) Field of Classification Search
  CPC .............................. H04L 45/306; H04L 43/10
  See application file for complete search history.

(56) References Cited

U.S. PATENT DOCUMENTS

| | | | |
|---|---|---|---|
| 10,523,539 B2 | 12/2019 | Mayya | |
| 2018/0062875 A1* | 3/2018 | Tumuluru | H04L 12/4641 |
| 2018/0331945 A1* | 11/2018 | Attarwala | H04L 47/2433 |
| 2018/0375744 A1* | 12/2018 | Mayya | H04L 47/22 |
| 2019/0036828 A1* | 1/2019 | Bajaj | H04L 41/5025 |
| 2019/0319872 A1* | 10/2019 | Adhikari | H04L 43/08 |
| 2020/0195557 A1 | 6/2020 | Duan | |

OTHER PUBLICATIONS

Michael Wood, Top Requirements on the SD-WAN Security Checklist, Network Security, Jul. 2017, pp. 9-11.
Raghavan Kasturi Rangan, Trends in SD-WAN and SDN, CSIT (Mar. 2020) 8(1):21 -27, Special Issue on SDN, Published online Apr. 22, 2020.
Vdovin et al., Network Utilization Optimizer for SD-WAN, 2014 IEEE.

* cited by examiner

*Primary Examiner* — Donald L Mills
(74) *Attorney, Agent, or Firm* — Van Pelt, Yi & James LLP

(57) ABSTRACT

Techniques for enhanced Software-Defined Wide Area Network (SD-WAN) path quality measurement and selection are disclosed. In some embodiments, a system/method/computer program product for enhanced SD-WAN path quality measurement and selection includes periodically performing a network path measurement for each of a plurality of network paths at a Software-Defined Wide Area Network (SD-WAN) interface; updating a version if the network path measurement exceeds a threshold for one or more of the plurality of network paths; and selecting one of the plurality of network paths for a session based on the version according to an application policy.

23 Claims, 19 Drawing Sheets

SD-WAN Connection

500

```
typedef struct pan_sdwan_conn_s {
    pan_bool_t is_tunnel;              // Indicates if the Connection is Tunnel
    pan_uint16_t ifnet_id;             // Tunnel ID or Interface ID
    pan_inx_addr_t dip;                // Public Destination IP of this Connection
    pan_uint8_t grade;                 // Link Grade of the Interface
    pan_sdwan_prob_data_t prob_data;   // Live Probing Data for this Connection
} pan_sdwan_conn_t;
```

FIG. 5

Mapping: From Tunnel ID to VIF and Connection

```
typedef struct pan_sdwan_map_s {
    pan_bool_t is_tunnel;
    pan_uint16_t ifnet_id;
    pan_inx_addr_t dip;
    pan_sdwan_conn_t *conn;
    pan_sdwan_intf_t *vif;
} pan_sdwan_map_t;
```

600 ⤴

| T1   | T2   | T3   | T4   |
|------|------|------|------|
| VIF1 | VIF1 | VIF2 | VIF2 |

APIs for Traversing Connections

```
/*
 * API to return total number of connections
 */
pan_uint16_t pan_sdwan_get_conn_count();

/*
 * API to traverse all connections in a circular way
 */
pan_sdwan_conn_t *pan_sdwan_get_next_conn();
```

FIG. 7

APIs for Updating Probing Data

```
/*
 * Given tunnel ID, return
 * SD-WAN virtual interface and pan_sdwan_conn_t data structures
 */
pan_bool_t
pan_sdwan_access_by_tunnel_id(
    pan_uint16_t tunnel_id,
    pan_sdwan_intf_t **intf,
    pan_sdwan_conn_t **conn) ;
```

Path Selection Pseudo Code

Path selection flow:

```
if (session next hop not valid OR link is down) {
    trigger path selection logic
} else {
    if (session type == weighted) {
        use current link
    } else
        if (version is the same) {
            use current link
        } else {
            if (current link still qualifying) {
                update health version
                use current path
            } else {
                if (current time - last path selection time < 2 minutes) {
                    use current path
                } else {
                    if (path selection strategy == best available) {
                        if (number of path re-selection > 1000 within last minute) { // adjust 1000 to more reasonable number with testing
                            use current path
                        } else {
                            trigger path selection logic
                            increment re-selection counter
                            update health version
                        }
                    } else {
                        trigger path selection logic
                        update health version
                    }
                }
            }
        }
}
```

Path selection logic:

Weighted distribution:
1. find all qualified paths from VIF and group them by tags.
2. identify minimum occupied group with regard to distribution percentage.
3. choose path from the group in round-robin fashion.

FIG. 11

Best available path:
1. Pick the first path from VIF as candidate.
2. Compare candidate's health with next path.
3. If candidate's health is better, keep its candidacy, otherwise replace the candidate.
4. Repeat step 2 and 3 until reach the end of list.

Top-down priority:
1. Traverse all tags configured in distribution profile.
2. Traverse all paths mapped to each tag (the first path selected by the loop should be round-robined).
3. Stop when a qualified path is found.
4. If no path is found at the end of loop, go to "Best available path" case.

FIG. 11(Cont.)

ENHANCED SD-WAN PATH QUALITY MEASUREMENT AND SELECTION

BACKGROUND OF THE INVENTION

Traditional Wide Area Networks (WANs) are typically based on conventional routers. Traditional WANs generally require backhauling all traffic (e.g., including cloud-destined traffic) from branch offices to a headquarters data center (e.g., or a hub). Various advanced security inspection services can then be applied to the backhauled traffic.

However, the delay caused by the backhauling operations reduces application performance. For example, such traditional WANs were not designed for the increasingly deployed cloud-based computing applications and solutions. As a result, such can result in a bad user experience and lost productivity due to the denigrated performance impact on cloud-based computing applications and solutions.

BRIEF DESCRIPTION OF THE DRAWINGS

Various embodiments of the invention are disclosed in the following detailed description and the accompanying drawings.

FIG. 5 provides an example SD-WAN Connection for implementing enhanced SD-WAN path quality measurement and selection in accordance with some embodiments.

FIG. 6 provides an example mapping from a Tunnel ID to a VIF and Connection for implementing enhanced SD-WAN path quality measurement and selection in accordance with some embodiments.

FIG. 7 provides example APIs for traversing connections for implementing enhanced SD-WAN path quality measurement and selection in accordance with some embodiments.

FIG. 8 provides example APIs for updating probing data for implementing enhanced SD-WAN path quality measurement and selection in accordance with some embodiments.

DETAILED DESCRIPTION

Figure 1:
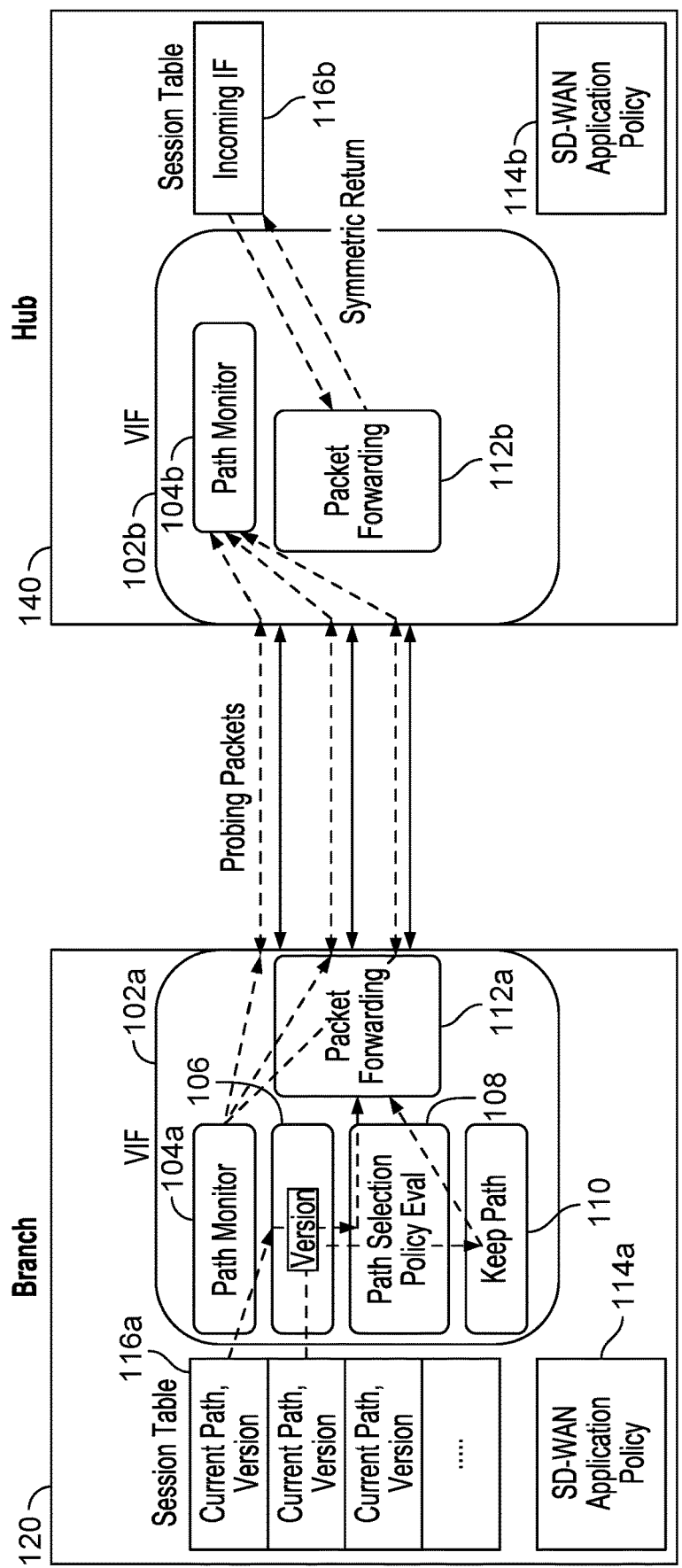
FIG. 1 is a block diagram of a system for enhanced Software-Defined Wide Area Network (SD-WAN) path quality measurement and selection in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Software-Defined Wide Area Networks (SD-WANs) allow for multiple network paths (e.g., also referred to herein as links or paths). Different network paths typically have different network performance metrics, such as real-time network path measurements of latency, jitter, and packet loss (e.g., between a branch office and a hub). A path monitoring component and a path selection component are generally important components for implementations of SD-WANs. The path monitoring component typically monitors and computes real-time network path quality conditions (e.g., latency, jitter, and packet loss rate). The path selection unit typically uses the measured results to choose the best path. Generally, to achieve sub-second failover performance, every packet going out of the SD-WAN interface is aware of the current quality of every possible network path.

Overview of Techniques for Enhanced SD-WAN Path Quality Measurement and Selection Frequently monitoring and computing real-time network path quality conditions (e.g., latency, jitter, and packet loss rate) is inefficient and generally requires additional memory to store the measurements as well as requiring additional computing resources (e.g., CPU cycles) to perform the comparison at the SD-WAN interface (e.g., implemented on a network device). For example, in high end products (e.g., network devices, such as firewalls) that support millions of sessions, such an inefficient approach can cause performance problems due to the impact on memory and computing resources.

What is needed are new and improved techniques for SD-WANs for selecting network paths for applications.

Versioning-Based SD-WAN Path Quality Measurement and Selection

Techniques for enhanced Software-Defined Wide Area Network (SD-WAN) path quality measurement and selection are disclosed.

Accordingly, in some embodiments, a system/method/computer program product for enhanced SD-WAN path quality measurement and selection includes periodically performing a network path measurement for each of a plurality of network paths at a Software-Defined Wide Area Network (SD-WAN) interface; updating a version if the network path measurement exceeds a threshold for one or more of the plurality of network paths; and selecting one of the plurality of network paths for a session based on the version according to an application policy.

For example, instead of using an approach that is only focused on raw latency, jitter, and packet loss rate values, a new versioning technique is used to indicate network path quality changes, and path selection determinations are based on the version associated with each monitored and measured network path. A version as used herein generally refers to a value (e.g., an integer or another value) associated with one set of path quality measurements at a specific time (e.g., the version can be broadcasted by the network path monitoring unit as further described below). If there is no path quality change (e.g., based on a sensitivity value that can be configured per application type as further described below), then the version remains the same (e.g., the version value is not incremented). For a network session (e.g., also referred to herein as a session), the version can be recorded while an initial network path is being selected for the session. After that point, subsequent packets will first check if the version on the selected network path has changed. If there is no change of the version associated with the selected network path, then there is no need to trigger the network path selection logic to recalculate the network path. As such, the computing and memory resource consuming activities associated with performing network path selection logic of the SD-WAN interface is avoided under normal situations, and the network path selection logic is generally only activated/triggered when the network path quality change has exceeded an application's threshold based on an application policy as further described below.

In an example implementation, SD-WAN is a technology that facilitates use of multiple Internet and private services to create an intelligent and dynamic WAN, which helps lower costs and maximizes application quality and usability. For example, Palo Alto Networks offers a commercially available solution that provides strong security with an SD-WAN overlay in a single management system. Instead of using costly and time-consuming Multi-Protocol Label Switching (MPLS) with components, such as routers, firewalls, WAN path controllers, and WAN optimizers to connect your WAN to the Internet, SD-WAN on a network device (e.g., a Palo Alto networks firewall or other commercially available or open source networking/security solution can similarly be used) facilitates using less expensive Internet services and fewer pieces of equipment (e.g., other WAN components need not be purchased and maintained).

Specifically, this example SD-WAN implementation (e.g., SD-WAN is integrated with the PAN-OS of a virtual/physical Palo Alto Networks firewall solutions thereby providing both the security features of a PAN-OS firewall and the SD-WAN functionality) supports dynamic, intelligent path selection based on applications and services and the conditions of links that each application or service is allowed to use. The path health monitoring for each link includes latency, jitter, and packet loss. For example, granular application and service controls allow users (e.g., network/security administrators) to prioritize applications based on whether the application is mission-critical, latency-sensitive, or meets certain health criteria. Dynamic path selection can also be configured to avoid brownout and node failure problems, because sessions can fail over to a better performing path (e.g., in less than one second).

The disclosed techniques for enhanced SD-WAN path quality measurement and selection facilitate sub-second failover. Specifically, without the disclosed techniques for SD-WAN path quality measurement and selection utilizing versioning, if the network path quality changes, then the network path monitoring unit would typically need to raise a flag and wait for all sessions to react to it. To ensure that each session has a chance to react, the raised flag would need to be maintained for some extended period of time before it can be cleared. During this period of time, any new network path quality changes typically would not be detected and reflected. As a result, this could potentially make such an approach to network path selection slow and inaccurate.

The disclosed techniques for enhanced SD-WAN path quality measurement and selection consume less storage resources. For example, storing latency, jitter, and packet loss values would require at least three bytes in data storage, while storing a version number (e.g., an integer) generally requires only a few bits in data storage. In high-end SD-WAN products that can support millions of sessions, this more efficient use of storage (e.g., memory) results in a significant improvement in usage of memory space on such SD-WAN products.

The disclosed techniques for enhanced SD-WAN path quality measurement and selection simplify the network path quality comparison logic thereby improving overall system performance (e.g., consume fewer computing resources). For example, instead of comparing two sets of latency, jitter, and packet loss values one by one, the disclosed techniques utilize a simple version check (e.g., comparing integer values), which uses fewer instructions in the network path quality selection logic. Under normal conditions, when there is no path quality change, the extra delay added to the packet processing flow by SD-WAN logic is de minimis.

The disclosed techniques for enhanced SD-WAN path quality measurement and selection facilitate enhanced control over how sensitive sessions react to the network path quality changes (e.g., using a sensitivity setting as further described below). Given that sessions only respond to version changes, the path monitoring unit can ignore minor fluctuations that do not exceed a configured threshold, and as a result, sessions do not have to react to small variations on the network, which generally avoids the inefficiencies associated with session flapping.

The disclosed techniques for enhanced SD-WAN path quality measurement and selection are not limited to SD-WAN. These techniques for path selection can similarly be applied to other network path selection situations as well. As an example, routers can be configured to send versioned probing packets (e.g., using the disclosed version-based path quality and selection techniques) to each other to report path quality to the control plane and thereby facilitate an efficient and more intelligent route selection mechanism.

SD-WAN Single-Sided Path Quality Measurement

The most common SD-WAN topology is a hub-and-spoke deployment. Packets can either come from a branch to a hub or in the reverse direction from the hub to the branch. In order to perform a path selection operation, both the branch device (e.g., the network device at the branch) and hub device (e.g., the network device at the hub) generally would need to maintain path quality measurements for every path. Given that the hub aggregates and dispatches a significant amount of SD-WAN traffic, the hub can often be connected to thousands of SD-WAN paths. As a result, to periodically send probing packets through each of the SD-WAN paths is not only inefficient but also consumes huge system resources and may cause performance issues at the hub device (e.g., the network device at the hub).

In an example SD-WAN topology, the branch office and the hub are connected through VPN tunnels. For each tunnel, its north path and south path could be completely different. However, considering the round-trip measurement, measuring from the branch device would have the exact same result as measuring from the hub device.

Assume that the latency for the north and south paths are L_north and L_south. When a probing packet is generated from the branch device, its round-trip time would be L_north+L_south. For the hub device, the round-trip time would be L_south+L_north, which is equal to the one measured from the branch side.

Accordingly, in some embodiments, a system/method/computer program product for enhanced SD-WAN path quality measurement and selection includes performing SD-WAN single-sided path quality measurement.

In an example implementation, the SD-WAN path quality measurement is only performed at the branch office side and piggy-backed to the hub through the measurement packet itself. As such, the hub device just reads the SD-WAN path quality measurements from incoming probing packets and utilizes such measurements in path selection logic as further described below.

As a result, in this example implementation, the hub is freed up from activities such as setting up and handling timer callbacks, constructing measurement packets, keeping history values, and calculating the new path quality data (e.g., performing such activities on the hub device can negatively impact the overall system performance on the hub device). Also, given that the hub device does not have to send out probing packets, the disclosed techniques also reduce network traffic on these network paths to/from the hub.

In this example implementation, path quality measurement is performed at the branch device. Once the data is ready, it is synchronized over to the hub device through the probing packet itself as described above. A probing packet starts from the branch device, reaches the hub device and delivers the measurement data, and then returns back to the branch device to complete a new round-trip measurement. Because the measurement data is piggybacked in the probing packets, no extra packet needs to be constructed at the hub side thereby reducing the use of computing and communication interface resources at the hub device.

SD-WAN Path Symmetric Return

For typical network devices (e.g., a network router), traffic will pass out of a certain interface and then return on the exact same interface. For an SD-WAN interface, given that the outgoing interface is a bundle of multiple physical or logical interfaces (e.g., a fat pipe), if the path selection is activated at every direction of every SD-WAN interface, it is possible that outgoing packets and returning packets will utilize different paths. However, this is unnecessary and inefficient, because generally the measurements on both sides would have the same values. Also, handling packets coming back on a different interface utilizes additional computing and storage resources on the network device (e.g., to implement that additional network path selection logic).

As such, instead of triggering path selection logic all the time, in an example implementation, path selection logic is only activated in one direction: when packets first reach the SD-WAN interface to pass out of the interface. For packets that first reach the SD-WAN interface by coming in, given that the path is already selected by a peer device, it is recorded and used to forward future returning traffic.

As a result, when returning packets reach the other side, they will enter the same original outgoing interface, which efficiently utilizes computing and storage resources on the network device implementation of the SD-WAN interface by eliminating unnecessary complexity of implementation of performing extra path selection logic.

Accordingly, in some embodiments, a system/method/computer program product for enhanced SD-WAN path quality measurement and selection includes performing an SD-WAN path symmetric return.

For example, for every session, two entries (e.g., B1 to B2 and B2 to B1) are created in the session table. If a packet first reaches the SD-WAN interface by going out, then normal path quality-based path selection logic will be triggered, and the best path is selected. However, if the packet first reaches the SD-WAN interface by coming in, then the incoming path will be recorded in the session table. As the reverse packet comes, instead of making an unnecessary extra path selection decision, the recorded path will be used to forward the packet.

A Tag-Based Network Path Selection

SD-WAN interfaces generally use policies to direct traffic to their optimal paths. An SD-WAN policy controls the ordering of choosing the best path for outgoing traffic. For example, users can create a policy designating Ethernet1/1 as the primary link, and Ethernet1/2 as the backup link. Under normal conditions, the traffic will be directed to the primary link; if network congestion is detected on the primary link, then the traffic can be switched to the backup link.

However, typical SD-WAN deployments include hundreds to thousands of branch offices, where network environments and wirings are more likely to be different than identical. For example, Branch A may have three Internet connections: Ethernet1/1 to a broadband vendor, Ethernet1/2 to a DSL vendor, Ethernet1/3 to an LTE vendor; and Branch B may have only two connections: Ethernet1/1 to an LTE vendor and Ethernet1/2 to a broadband vendor. Even such minor differences between these two branch offices can require two different policy configurations. Consider a use case scenario of thousands of branch offices all with heterogeneous network environments and settings, the complexity of creating pre-defined rules for the entire SD-WAN deployment for such a networking environment would be a difficult and time consuming task for users (e.g., network/system administrators).

The disclosed techniques include another layer between the SD-WAN policy and the physical interface, which is referred to herein as a tag. A tag is an abstract symbol that can be attached to one or multiple SD-WAN interfaces. In the above example, we can create three tags: "primary," "backup1," and "backup2. For Branch A, tags can be applied to interfaces this way: "primary"→Ethernet1/1, "backup1"→Ethernet1/2, "backup2"→Ethernet1/3. For Branch B we can assign these tags as follows: "primary"→Ethernet1/2, "backup1"→Ethernet1/1.

As such, with these assigned/configured tags, users can more easily and efficiently create a single SD-WAN policy applicable to both situations: under normal condition traffic will go to interfaces tagged "primary," if network congestion is detected at the primary interface, then the SD-WAN policy is configured to switch traffic to interfaces tagged "backup1," and if that link is still not satisfying the path quality measurements, then switch traffic to interfaces tagged "backup2."

Because links at different geographic locations can often differ greatly in terms of cost, bandwidth, latency, and quality, path selection methodology generally should be flexible enough to accommodate for different situations. The disclosed tag-based policy configuration provides a dynamic and flexible policy for configuring large scale SD-WAN deployments.

The disclosed SD-WAN tagging related techniques facilitate Zero Touch Provisioning (ZTP) deployment. In order to achieve ZTP, SD-WAN policies generally should be centrally created and dispatched to other locations (e.g., remote branch offices, etc.). With the disclosed SD-WAN tagging related techniques, it is much easier for users to create a set of general policies that are applicable to all locations (e.g., remote branch offices, etc.). On the other hand, if there is no tag, every branch office would require a different set of policies, which does not allow for the desired ZTP.

The disclosed SD-WAN tagging related techniques also facilitate easier to handle configuration changes in SD-WAN policies. In the example above, if branch B adds another Internet connection through Ethernet1/3, and the customer wants that new Internet connection to be part of the primary selection, then they can just label that new interface with the "primary" tag. There is no need to change the SD-WAN policy configuration as provided in the above example.

Tags can be used in different ways within a policy to create hierarchical as well as equal opportunity path selection rules. For example, users can create a top-down waterfall selection among multiple tags, where any tag can be associated with multiple interfaces. When doing the path selection, path selection logic first makes selections based on tags, after a specific tag is decided, if there are multiple interfaces attached to it, an equal opportunity selection algorithm can be applied. As such, this make the policy very flexible and powerful.

Accordingly, in some embodiments, a system/method/computer program product for enhanced SD-WAN path quality measurement and selection includes performing a tag-based network path selection.

In an example implementation, configuring the SD-WAN policy includes the following three operations: (1) labeling physical interfaces with predefined tags; (2) creating a path quality profile and traffic distribution profile (e.g., the distribution profile includes the predefined tags); and (3) creating the SD-WAN policy and binding the previously created quality profile and traffic distribution profile to it. Tags are shared between traffic distribution profiles and physical interfaces. When SD-WAN policies are created, physical interface information upon which the policies will take effect does not have to be present. The binding between policies and interfaces can be performed after pushing out a configuration push (e.g., pushing out the configuration to the remote locations).

Given that the coupling between the SD-WAN policy and interface is indirect, it is possible to create a single policy that can be applied to many different situations as similarly described above. An example Unified SD-WAN POLICY will now be described. For YouTube traffic, use interface tagged with "broadband1" if its latency is below 120 ms and jitter is below 50 ms; if it is not qualified, then check interface tagged with "broadband2"; if it is still not qualified, then check interface tagged with "LTE."

Various embodiments for enhanced SD-WAN path quality measurement and selection will now be further described.

Example System Architectures for Enhanced SD-WAN Path Quality Measurement and Selection FIG. 1 is a block diagram of a system for enhanced Software-Defined Wide Area Network (SD-WAN) path quality measurement and selection in accordance with some embodiments.

Link bundling allows for grouping multiple physical links (e.g., that different ISPs use to communicate with the same destination, such as various broadband providers, DSL providers, cellular LTE providers, satellite network providers, etc.) into a virtual SD-WAN interface. On the basis of applications and services, the network device (e.g., firewall or another virtual or physical network device that implements the disclosed virtual SD-WAN interface) chooses from the links (e.g., path selection) for session load sharing and/or to provide failover protection, such as in the event of a brownout or blackout. Thus, the application is thereby provided with the interface that provides the best quality performance based on the application policy. As such, the network device can automatically perform session load sharing over the links in a virtual SD-WAN interface to use available bandwidth advantageously. An SD-WAN interface generally is configured with all of the same link type (e.g., either Direct Internet Access (DIA) or Virtual Private Network (VPN)). VPN links can support the hub-and-spoke topology.

In an example implementation, an SD-WAN interface supports the following types of WAN connections: ADSL/DSL, cable modem, Ethernet, fiber, LTE/3G/4G/5G, MPLS, microwave/radio, satellite, Wi-Fi, and anything that terminates as Ethernet to the communication interface of the network device. Users (e.g., network/security administrators (admins)) can configure SD-WAN interface policies to implement their preferred strategy for how to best use the links (e.g., using inexpensive broadband connections before expensive MPLS or LTE connections; alternatively, using specific VPN tunnels to reach certain hubs in a region, etc.).

A management solution (e.g., Panorama is a management solution that is commercially available from Palo Alto Networks, Inc. or another commercially available or open source management solution can similarly be used) provides a mechanism to configure and manage SD-WAN interfaces, which makes configuring multiple options on many geographically-dispersed network devices much faster and easier than configuring such network devices individually (e.g., pushing SD-WAN policy configurations to different locations, which can include configurations based on tags as described herein). For example, users can configure/change network configurations from a single location rather than having to travel to each branch or configure each firewall individually. As another example, auto VPN provisioning allows Panorama to configure branches and hubs with secure IKE/IPSec connections. A VPN cluster defines the hubs and branches that communicate with each other in a geographic region. Users can configure whether an interface supports VPN data tunnels. In an example implementation, the network device uses VPN tunnels for path health monitoring between a branch and a hub to provide sub-second detection of brownout conditions.

The management solution can also provide a dashboard provides that visibility into SD-WAN links and performance so that users can adjust path quality thresholds and other aspects of SD-WAN to improve its performance. Centralized statistics and reporting can include application and link performance statistics, path health measurements and trend analysis, and focused views of application and link issues.

The disclosed enhanced SD-WAN path quality measurement and selection techniques can be implemented on a commercially available or open source network device that serves as a branch or that serves as a hub or a data center (e.g., implemented on a Palo Alto Networks next-generation firewall, such as a virtual and/or PA-Series Firewall, that is commercially available from Palo Alto Networks).

Referring to FIG. 1, a Branch 120 and a Hub 140 are in communication via a plurality of network paths connected via virtual interfaces. Branch 120 includes a Virtual Interface (VIF) 102a and a Session Table 116a. VIF 102a includes a Path Monitor component 104a for periodically measuring a network path quality for each network path configured for VIF 102A, a Version component 106 for determining whether to increase a version (e.g., an integer value) assigned to a network path configured for VIF 102A based on results of probing packets using Path Monitor 104a, a Path Selection Policy Eval component 108 that includes logic for selecting one of the network paths configured for VIF 102A for a given session (e.g., new or existing session), a Keep Path component 110 that includes logic for maintaining a network path previously selected for a given session, and a Packet Forwarding component 112a that forwards packets from VIF 102a to VIF 102b. Session Table 116a includes Current Path Version entries for each session in the session table.

As also shown, probing packets are sent between VIF 102a and VIF 102b using Path Monitor 104a and Packet Forwarding 112a of VIF 102a and Path Monitor 104b and Packet Forwarding 112b of VIF 102b for performing the disclosed network path quality and measurement (e.g., latency, jitter, and packet loss and/or other/different network path quality measurements can similarly be performed) using the disclosed single-sided path quality measurement for performing such measurements using VIF 102a of Branch 120. For example, if a network path quality measurement for a given network path exceeds a policy configured threshold, then a new Version value is assigned to that network path, which can trigger a new or existing session to be assigned to a different network path based on an SD-WAN Application Policy 114a of Branch device 120 and SD-WAN Application Policy 114b of Hub device 140 that can also implement the disclosed tag-based network path selection techniques as further described herein. Hub 140 also includes a Session Table 116b that stores an Incoming Interface (IF) for each session for implementing the disclosed symmetric return techniques.

Additional logical components/features can be included in this example system embodiment. For example, the Branch/Hub components described above with respect to FIG. 1 (e.g., implemented using a network device, such as a virtual/physical firewall) can also include various Deep Packet Inspection (DPI) components for monitoring sessions, decoding protocols, and identifying an application (e.g., application ID) associated with each of the monitored sessions and, in some cases, further identifying various other attributes associated with each of the monitored sessions (e.g., user ID, content ID, etc.) for enforcing various SD-WAN policies and/or other networking/security related policies in various embodiments.

In an example implementation, the Path Monitor component uses a timer to periodically send out probing packets. Upon receiving the probing packets, latency, jitter, and packet loss are calculated using the disclosed single-sided path quality measurement techniques. They are compared to the values associated with the current version published to the SD-WAN interface. If the difference exceeds a configured sensitivity threshold, then the version is incremented by a value of 1, and the old network path quality data is replaced by the new one. For every currently active session, the version being used and the network path selected is stored associated with the session in Session Table 116a as shown in FIG. 1. When a new packet arrives, this version is compared with the published version on the SD-WAN interface. If they are the same, then the keep path logic (110) will continue to use the current path. If they are different, then the network path selection logic (108) will be triggered to select the best path; upon a successful selection, then the new version and the new path will be saved along with the session in the session table for later use.

Below is an example of versioning-based SD-WAN path quality measurements using an SD-WAN path monitor (e.g., from the perspective of the producer SD-WAN packet processor) that performs the following at these time check points t1, t2, and t3.

The configured Sensitivity is set to 5%.

At t1: Path quality A: latency 100 ms, jitter 30 ms, loss 5% . . . version 105.

At t2: Path quality A: latency 102 ms, jitter 31 ms, loss 5% . . . change <5%, version 105.

At t3: Path quality A: latency 98 ms, jitter 29 ms, loss 5% . . . change <5%, version 105.

The consumer (SD-WAN packet processor) performs the following at these time check points t1, t2, and t3.

At t1: Check path quality A, B and C, select path, and record version 105.

At t2: Version not changed, keep selected path.

At t3: Version not changed, keep selected path.

Figure 2:
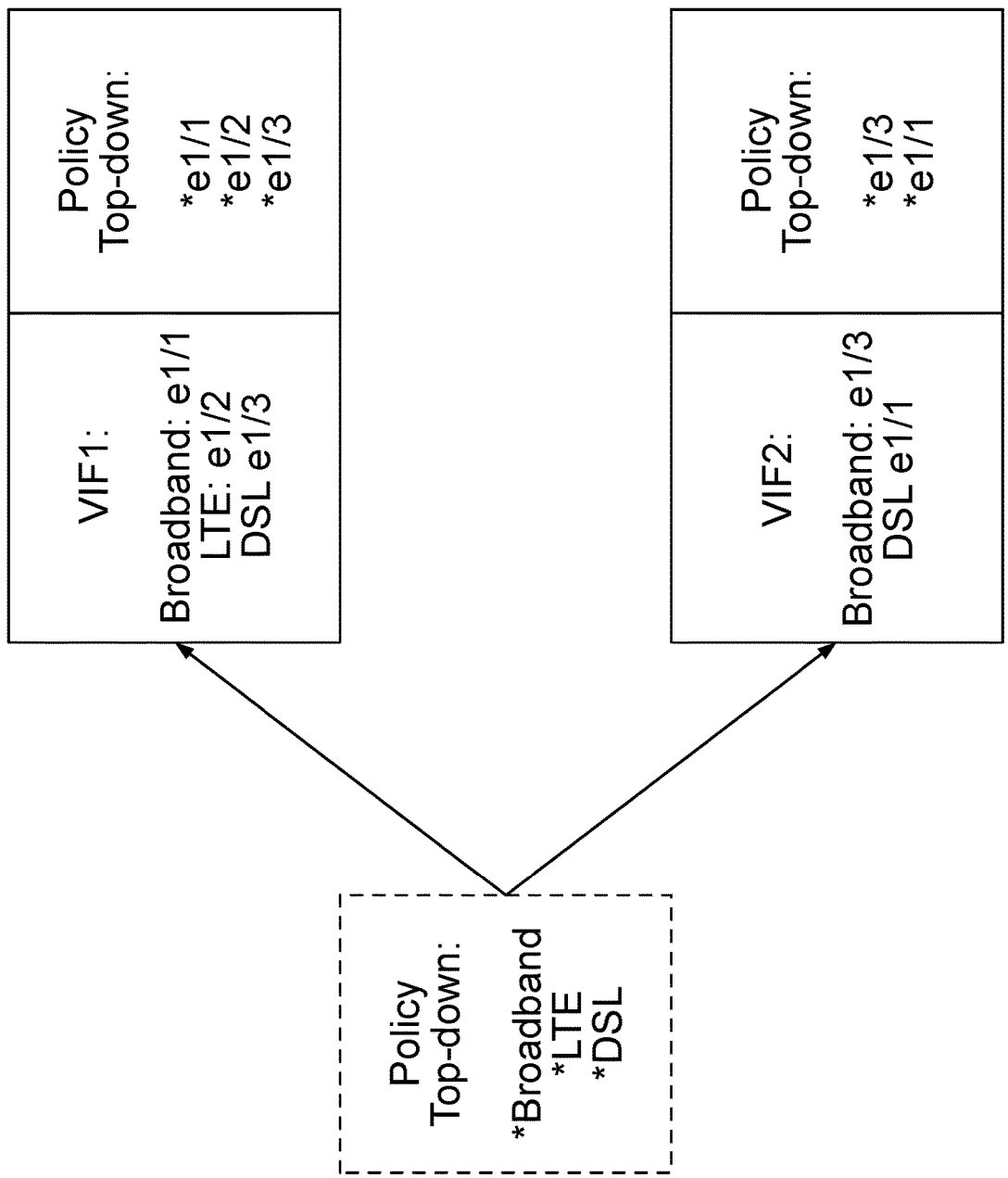
FIG. 2 is a block diagram of an SD-WAN policy in accordance with some embodiments.

FIG. 2 is a block diagram of an SD-WAN policy in accordance with some embodiments.

In this example SD-WAN policy, the elements of an SD-WAN configuration work together, allowing users (e.g., network/system admins) to group physical Ethernet interfaces that share a common destination into a logical SD-WAN interface, control link speeds, specify the thresholds at which a deteriorating path (e.g., or brownout or blackout) to an SD-WAN warrants selecting a new best path, and specify the mechanism for selecting that new best path. This example SD-WAN policy view indicates the relationships between elements at a glance.

The SD-WAN configuration allows for control of which links your network traffic takes by specifying the VPN tunnels or Direct Internet Access (DIA) links that certain applications or services take from a branch to a hub or from a branch to the Internet. Users can group paths so that if one path deteriorates, then a new best path is selected.

A Tag name of your choice identifies a link; users can apply the Tag to the link (e.g., interface) by applying an Interface Profile to the interface. A link can have one Tag in this example implementation. The Tag is referenced in the Interface Profile and the Traffic Distribution Profile. Tags allow users to control the order that interfaces are used for traffic distribution (e.g., Low Cost Paths, General Access, Private HQ, Backup, etc.). Tags allow the management solution to systematically configure many interfaces across many network devices with SD-WAN functionality.

An SD-WAN Interface Profile specifies the Tag that users can apply to the physical interface, and also specifies the type of Link that the interface is (e.g., ADSL/DSL, cable modem, Ethernet, fiber, LTE/3G/4G/5G, MPLS, microwave/radio, satellite, Wi-Fi, or other). The Interface Profile is also where users can specify the maximum upload and download speeds (e.g., in Mbps) of the ISP's connection. Users can also change whether the firewall monitors the path frequently or not; the firewall monitors link types appropriately by default numbered, virtual SD-WAN Interface to which traffic can be routed. The paths belonging to the SD-WAN Interface generally all go to the same destination WAN.

A Path Quality Profile specifies maximum latency, jitter, and packet loss thresholds that, when one of these thresholds for a path is exceeded, indicate that the path is deteriorated enough that the VIF of the network device selects a new path to the WAN. A Sensitivity configuration setting of, for example, high, medium, or low lets users indicate to the VIF of the network device which path monitoring parameter is more important for the applications to which the profile applies.

The Path Quality Profile can reference one or more SD-WAN Policy Rules; thus, users can specify different thresholds for rules applied to packets having different applications, services, sources, destinations, zones, and users.

A Traffic Distribution Profile specifies how the network device determines a new best path if the current preferred path exceeds a path quality threshold. Users can specify which Tags the distribution mechanism uses to narrow its selection of a new path. The Traffic Distribution Profile specifies one of three example distribution mechanisms: (1) Best Available Path; (2) Top Down Priority; and (3) Weighted Session Distribution.

The preceding elements come together in SD-WAN Policy Rules. As such, users can reference a Path Qualify Profile and a Traffic Distribution Profile in a rule, along with packet applications/services, sources, destinations, and users to specifically indicate when and how the network device performs application-based SD-WAN path selection for a packet not belonging to a session.

Referring to FIG. 2, an example SD-WAN Policy includes rules for VIF1 and for VIF2. For example, VIF1 is configured with three virtual interfaces as shown at 202: (1) Broadband: e1/1; (2) LTE: e1/2; and (3) DSL: e1/3. The policy includes top-down rules for e1/1, e1/2, and e1/3 as shown at 204.

An example SD-WAN Policy 1 includes the following rules: for YouTube traffic, use Ethernet 1/1 (e.g., Comcast) if its latency is below 120 ms and jitter is below 50 ms; if Ethernet 1/1 is not qualified, then check Ethernet 1/2 (e.g., AT&T); if Ethernet 1/2 is not qualified, then check Ethernet (1/3) (e.g., LTE).

Another example SD-WAN Policy 1 includes the following rules: for YouTube traffic, use Ethernet 1/3 (e.g., Comcast) if its latency is below 120 ms and jitter is below 50 ms; if Ethernet 1/3 is not qualified, then check Ethernet 1/2 (e.g., AT&T); if Ethernet 1/2 is not qualified, then check Ethernet 1/1 (e.g., LTE).

Figure 3:
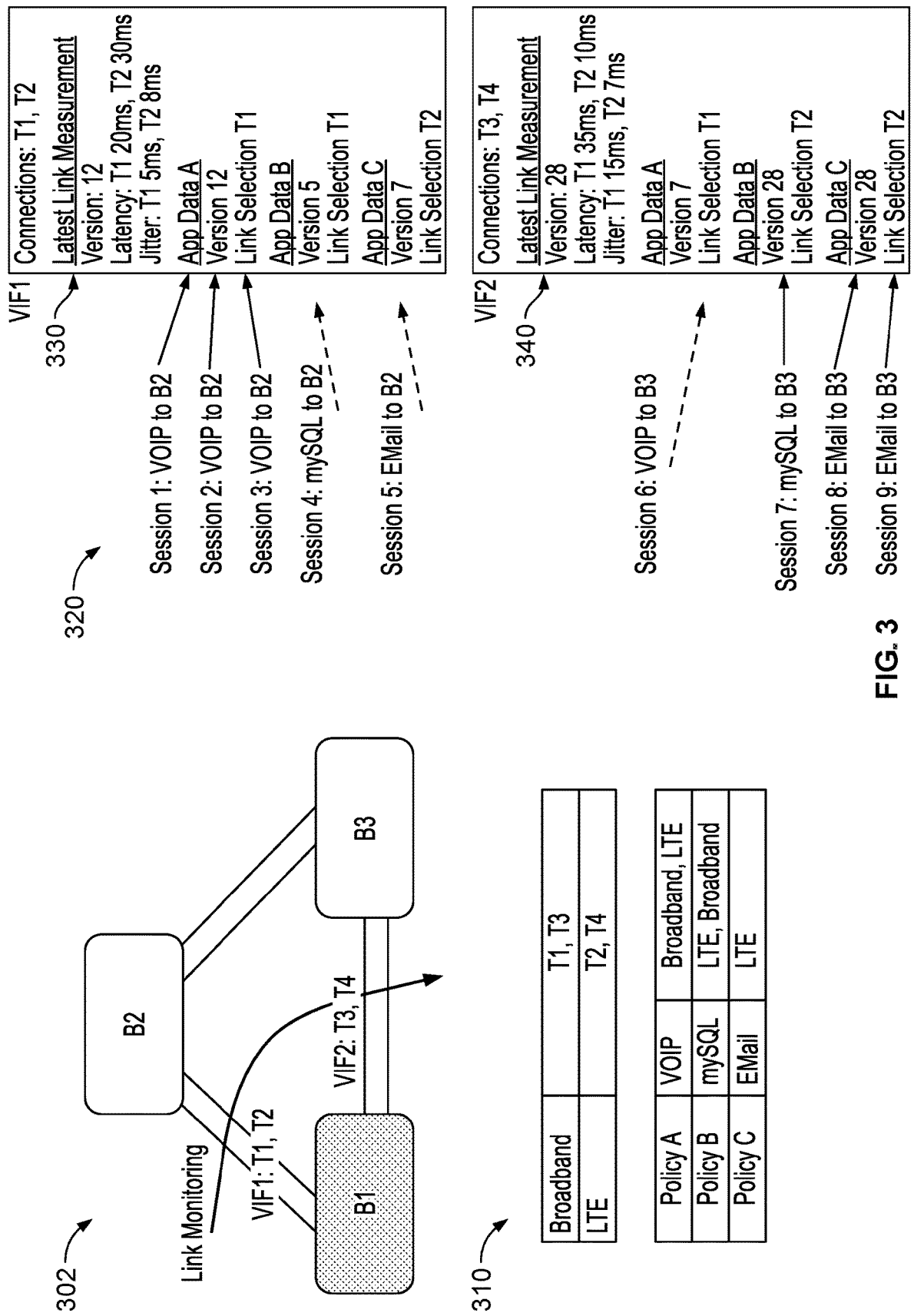
FIG. 3 is a functional diagram illustrating network path monitoring and network path selection based on an SD-WAN policy for virtual interfaces between branch offices in accordance with some embodiments.

FIG. 3 is a functional diagram illustrating network path monitoring and network path selection based on an SD-WAN policy for virtual interfaces between branch offices in accordance with some embodiments. In this example, the SD-WAN policy provides different policies based on application types (e.g., Voice Over IP (VOIP), MySQL, and Email).

Referring to FIG. 3, link (e.g., network path) monitoring for each Virtual Interface is performed for VIF1 between Branch Office (B1) to Branch Office (B2) and for VIF2 between Branch Office (B1) and Branch Office (B3) as shown at 302. Link monitoring can be performed as similarly described above with respect to FIGS. 1 and 2.

An example SD-WAN policy is shown at 310. Broadband links (e.g., network paths) are provided at T1 of VIF1 and T3 of VIF2. LTE links are provided at T2 of VIF1 and T4 of VIF2. The SD-WAN policy includes an application policy for different applications. Specifically, Policy A for VOIP applications is configured to select Broadband and then LTE links. Policy B for MySQL applications is configured to select LTE and then Broadband links. Policy C for Email is configured to select LTE links. The SD-WAN policy can be implemented as similarly described above with respect to FIGS. 1 and 2.

Example sessions (e.g., Sessions 1-9) associated with different applications that are passing through VIF1 (e.g., from B1 to B2) or VIF2 (e.g., from B1 to B3) are shown at 320. In an example implementation, the sessions are examined using Deep Packet Inspection (DPI) to determine an application associated with each of the sessions (e.g., SD-WAN interfaces implemented using a virtual/physical next-generation firewall, such as commercially available next-generation firewalls from Palo Alto Networks, can be used as similarly described above with respect to FIG. 1 or other commercially available or open source network devices capable of implementing DPI and the disclosed SD-WAN interfaces can similarly be used).

Example link measurements are performed for VIF1 as shown at 330 and for VIF2 as shown at 340. Based on the link measurements shown at 330 and 340 and based on SD-WAN policy 310 path quality measurement and selection for each of the sessions (e.g., Sessions 1-9) is performed as similarly described above with respect to FIGS. 1 and 2.

For example, the Latest link measurement data for connections T1 and T2 of VIF1 includes a version value of 12, Latency measurements of 20 milliseconds (ms) for T1 and 30 ms for T2, and Jitter measurements of 5 ms for T1 and 8 ms for T2. As such, App data A for sessions (e.g., Sessions 1-3) associated with Policy A for VOIP related applications selects link T1 and is associated with a version value of 12 for the Link selection of T1 (i.e., a Broadband link) between branch office B1 and branch office B2. App data C for a session(s) (e.g., Session 5) associated with Policy C for Email related applications selects link T2 and is associated with a version value of 7 for the Link selection of T2 (i.e., an LTE link) between branch office B1 and branch office B2. Various other examples are similarly shown for other applications for VIF1 and VIF2 as shown in FIG. 3.

Figure 4:
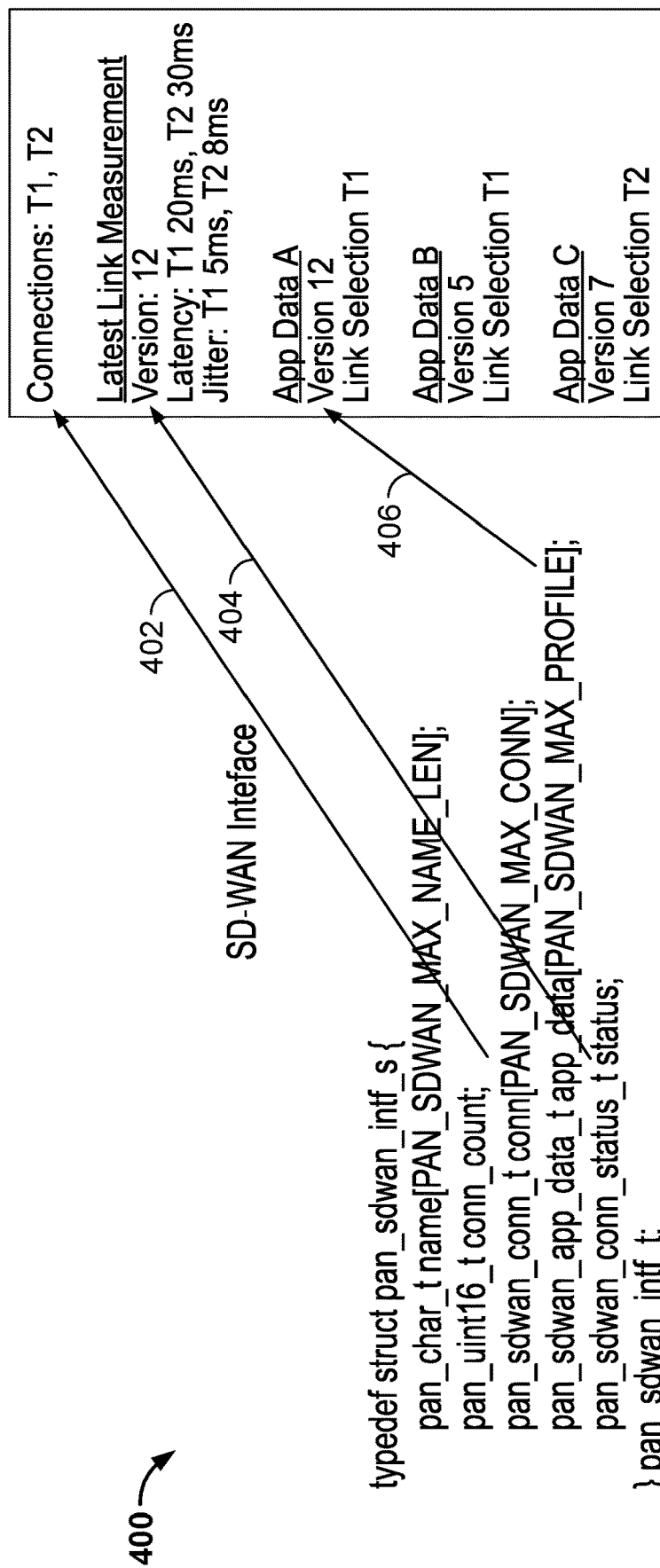
FIG. 4 provides an example SD-WAN Interface for implementing enhanced SD-WAN path quality measurement and selection in accordance with some embodiments.

FIG. 4 provides an example SD-WAN Interface for implementing enhanced SD-WAN path quality measurement and selection in accordance with some embodiments. In this example shown at 400, the SD-WAN Interface includes parameters for the supported links (e.g., Connections: T1, T2) as shown at 402, the connection status based on network path monitoring (e.g., Latest link measurement values including a Version value, Latency measurement, and Jitter measurement) as shown at 404, and an SD-WAN profile (e.g., App data based on an application policy for selecting a network path based on the network path monitoring and the application policy) as shown at 406.

FIG. 5 provides an example SD-WAN Connection for implementing enhanced SD-WAN path quality measurement and selection in accordance with some embodiments. In this example shown at 500, the SD-WAN connection includes parameters to indicate if the connection is a tunnel, a Tunnel ID or interface ID, a Public destination IP of this connection, a Link grade of the interface, and Live probing data for this connection.

FIG. 6 provides an example mapping from a Tunnel ID to a VIF and Connection for implementing enhanced SD-WAN path quality measurement and selection in accordance with some embodiments. In this example shown at 600, T1 and T2 are mapped to VIF1 and T3 and T4 are mapped to VIF2 as shown at 602.

FIG. 7 provides example APIs for traversing connections for implementing enhanced SD-WAN path quality measurement and selection in accordance with some embodiments. In this example shown at 700, an API to return a total number of connections and an API to traverse all connections in a circular way are provided.

FIG. 8 provides example APIs for updating probing data for implementing enhanced SD-WAN path quality measurement and selection in accordance with some embodiments. In this example shown at 800, APIs for updating probing data are provided.

Figure 9A:
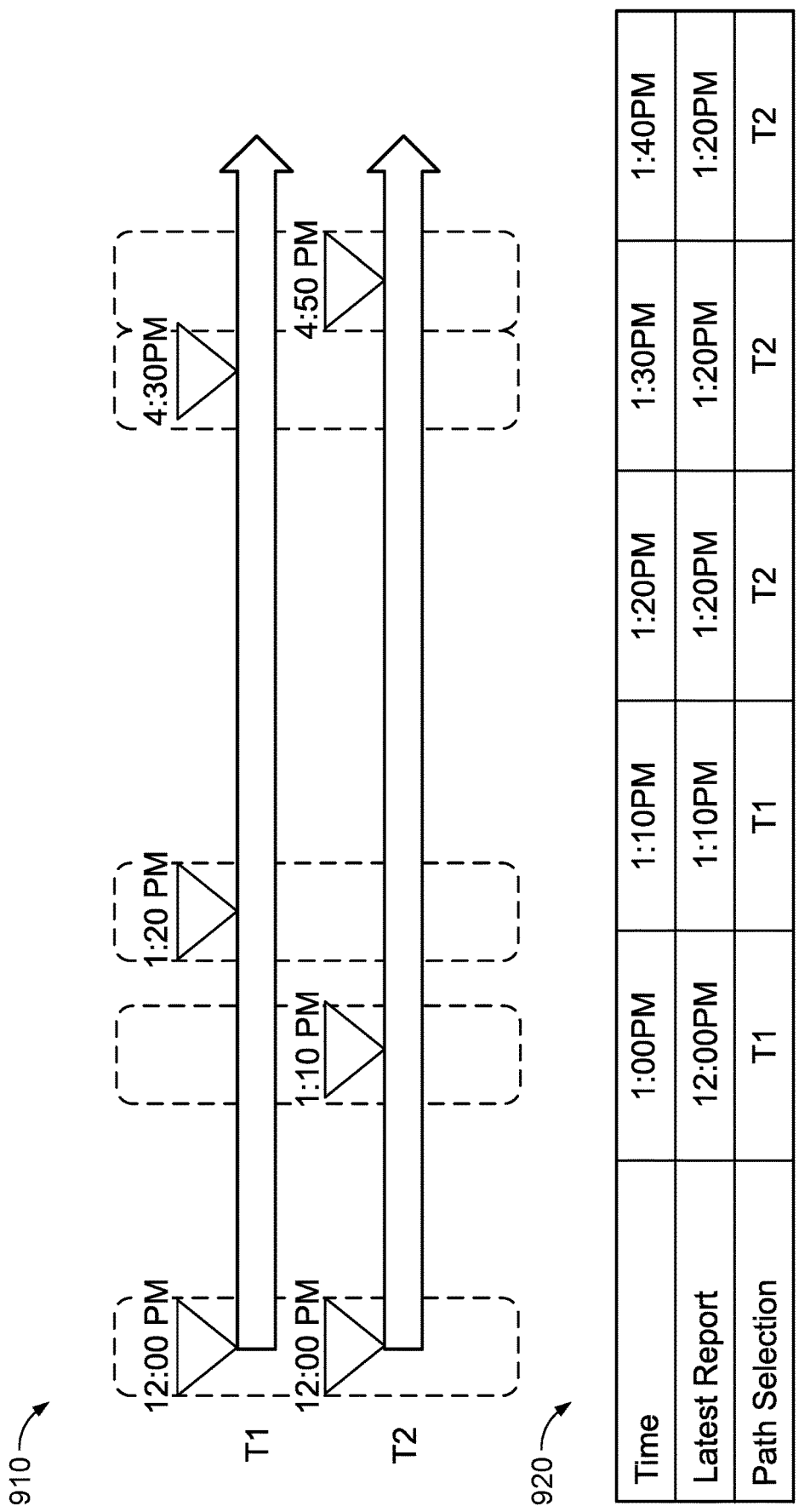
FIGS. 9A and 9B illustrate different path selections using enhanced SD-WAN path quality measurement and selection in accordance with some embodiments.
Figure 9B:
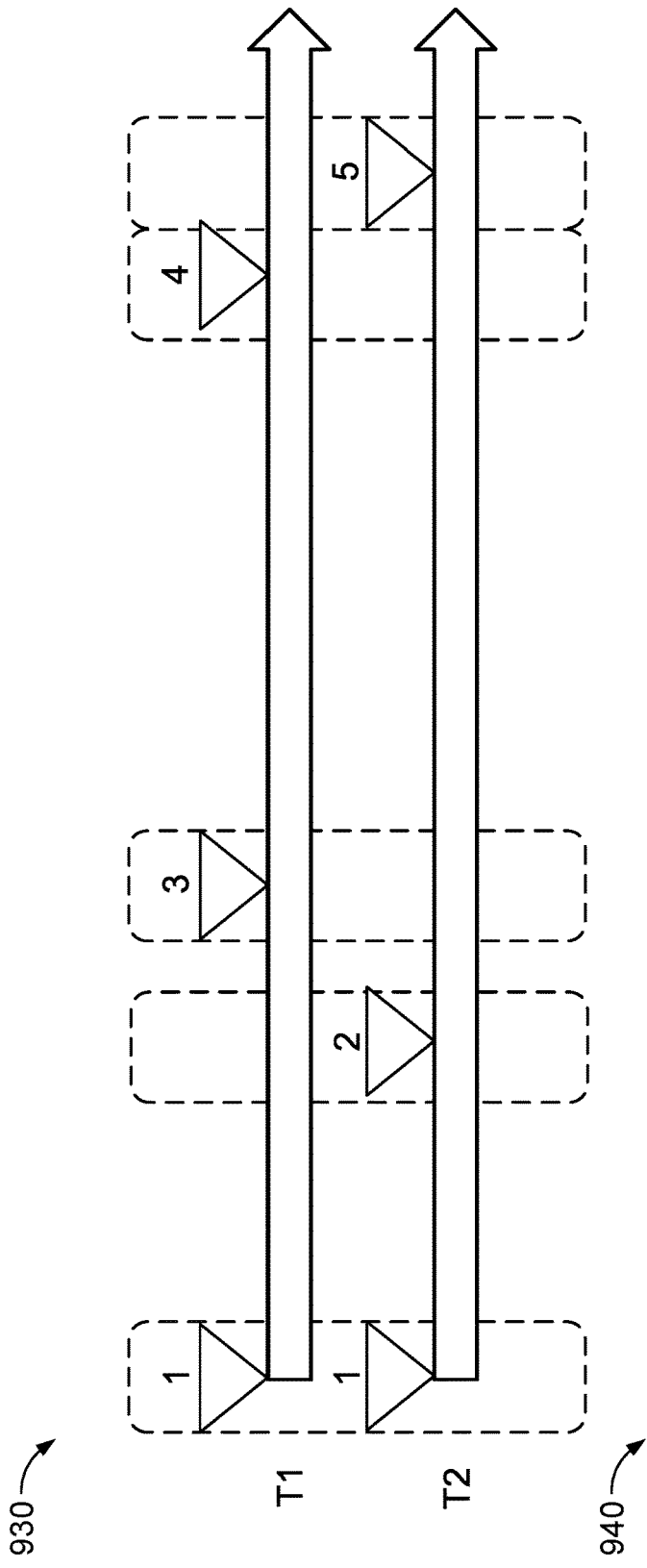

FIGS. 9A and 9B illustrate different path selections using enhanced SD-WAN path quality measurement and selection in accordance with some embodiments. Referring to FIG. 9A, a timeline showing different network path quality measurements for links T1 and T2 is shown at 910, and a chart that indicates a Time, Latest Report Time, and Path Selection is shown at 920. Referring to FIG. 9B, a timeline showing different network path quality measurements for links T1 and T2 is shown at 930, and a chart that indicates a Time, Announced Version, Packet Event, Flow Version, and Path Selection is shown at 940.

Figure 10:
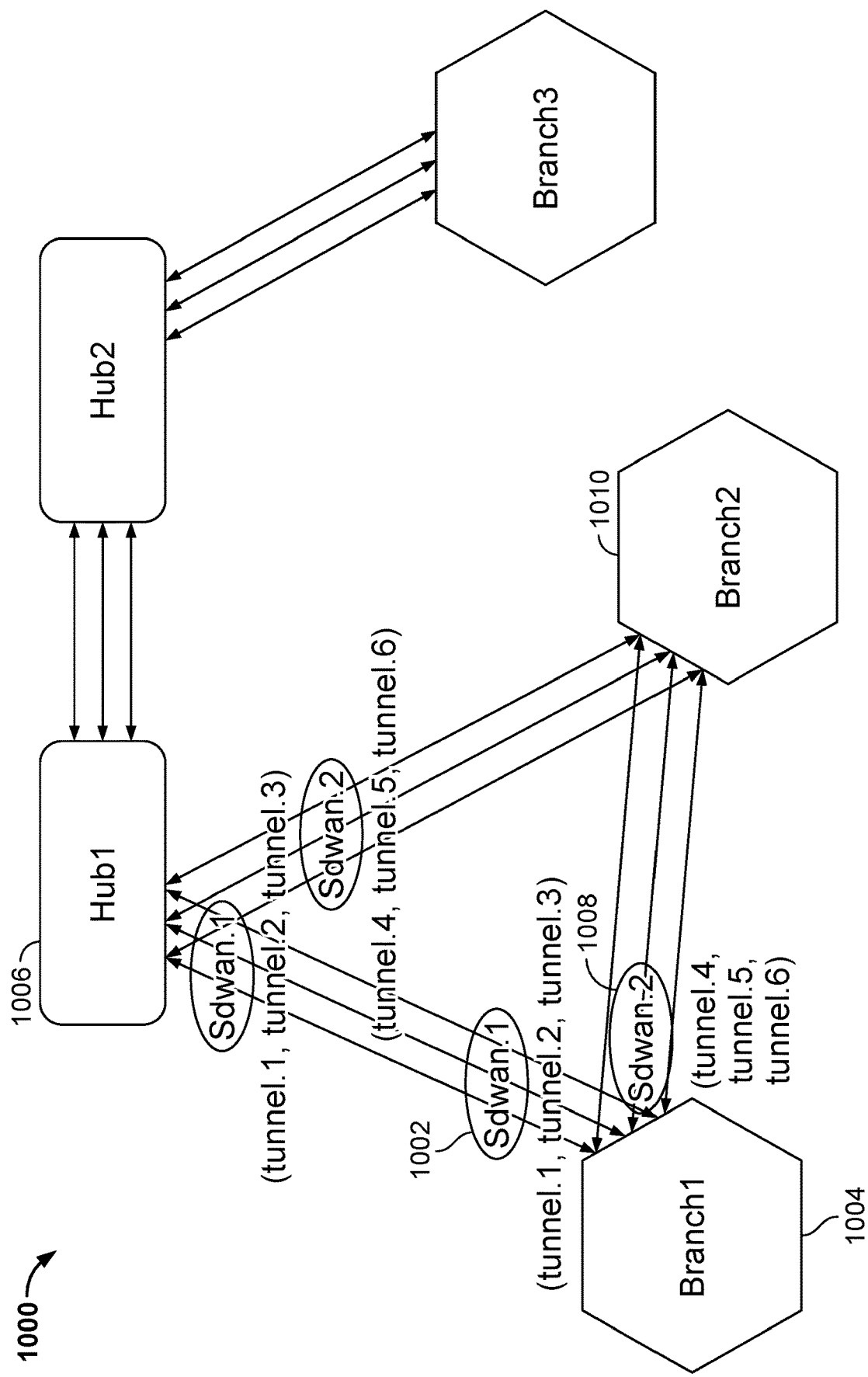
FIG. 10 illustrates a diagram of an example enterprise network using enhanced SD-WAN path quality measurement and selection in accordance with some embodiments.

FIG. 10 illustrates a diagram of an example enterprise network using enhanced SD-WAN path quality measurement and selection in accordance with some embodiments. An example enterprise network 1000 includes three branch offices and two hubs that are configured with links using SD-WAN interfaces as shown in FIG. 10. For example, SD-WAN.1 1002 includes three links (tunnel.1, tunnel.2, tunnel.3) between Branch1 1004 and Hub1 1006. SD-WAN.2 1008 includes three links (tunnel.4, tunnel.5, tunnel.6) between Branch1 1004 and Branch2 1010 and between Branch2 1010 and Hub1 1006.

Figure 11:
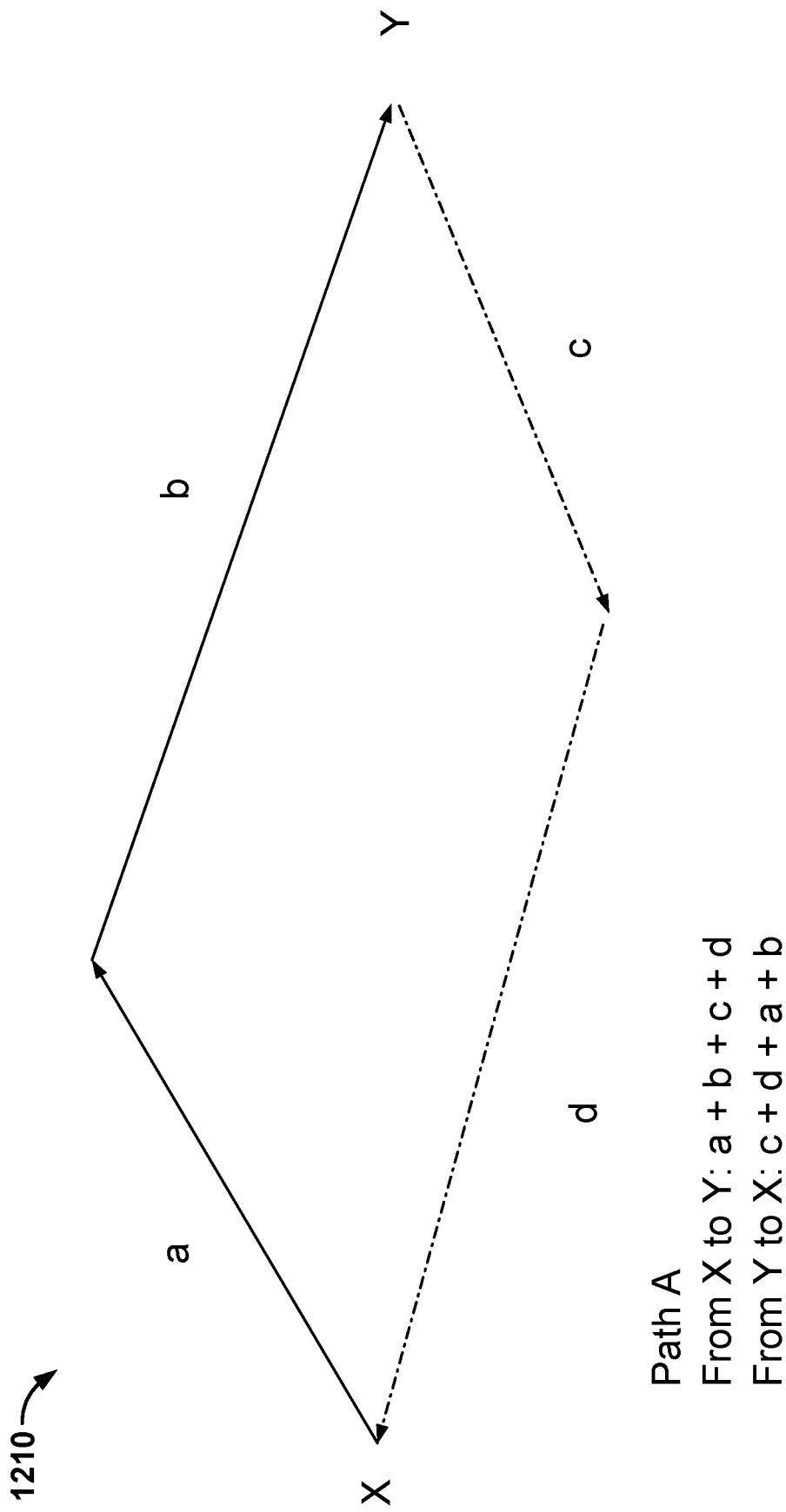
FIG. 11 provides example pseudo code for implementing path selection logic using enhanced SD-WAN path quality measurement and selection in accordance with some embodiments.

FIG. 11 provides example pseudo code for implementing path selection logic using enhanced SD-WAN path quality measurement and selection in accordance with some embodiments. Path Selection pseudo code is shown at 1100 in FIG. 11 as further described below.

If no active session is found, the incoming packet proceeds through a regular path for session setup, which will now be described. A session allocation and installation are performed. A Layer-3 (L3) route lookup is performed. If a next hop is an SD-WAN virtual interface, then the packet is an SD-WAN packet. An SD-WAN policy lookup is performed and embed result SD-WAN ID in the session table is performed. Feed packet into a fast path with matched session is then performed.

SD-WAN path selection logic for traffic initiated from a local interface will now be described. Obtain the following from the SD-WAN policy lookup result: policy ID, link profile ID, and path health ID. Use the path health ID to index into a health table inside the virtual interface, and obtain the probing version currently being used. Compare this version with a global version contained in the virtual interface, if they are the same, forward the packet as usual. Otherwise, use the link profile ID and the path health ID to obtain the link profile (e.g., includes link selection strategy) and an app profile (e.g., includes a minimum requirement of latency, jitter, and packet loss rate in the app profile in the application policy).

If the link selection strategy is configured to be Weighted Session Distribution, then the outgoing link is picked up for the first packet based on existing distribution and never adjusted. Only links that meet the requirements of the app profile will participate in the distribution. If the link selection strategy is configured to be Best Available Path, then all available links will be evaluated and the one with the highest quality is selected. If the link selection strategy is configured to be Top Down Priority, then all the available links will be traveled from the beginning to end, and the first link to meet the requirements from the app profile is selected. If none of them meets the requirement, select the best link (e.g., defaults to the Best Available Path case).

When evaluating a link quality, a configured sensitivity value in the app profile is used, and a high sensitivity item is considered as will now be described. For example, when comparing two links, one has 100 ms delay and 20 ms jitter, and the other has 300 ms delay and 10 ms jitter, if the sensitivity for latency is high then the former wins, if the sensitivity for jitter is high then the latter wins. If all of latency, jitter, and packet loss rate have equal sensitivities (e.g., configured to sensitivity values equal to high), then the judging order is implemented as follows: packet loss rate, latency, and jitter. If all links are down, then the packet will be dropped (e.g., this situation should be detected and handled by the routing protocol through a route change).

As such, for Weighted Session Distribution configurations, new sessions are distributed among qualified paths based on configured weights. However, redistribution for existing sessions will generally not happen afterwards even if the path degrades. For Best Available Path configurations, the best path will be chosen among all configured paths. If the link quality degrades, then a new path (e.g., which in some cases may be the path currently selected) is selected for upcoming traffic. For Top Down Priority configurations, the first qualified path is selected, and re-selections can happen if path condition changes are detected.

Path qualification will now be described. A path quality profile provides the maximum values of latency, jitter, and packet loss. If the measurements of a connection are all below or equal the configured thresholds, then the connection is considered qualified. If any measurement exceeds the corresponding threshold, then the connection is considered disqualified. The link/path monitoring component (e.g., Path Monitor 104a of FIG. 1) provides two sets of measurements: real-time and versioned. Real-time measurements represent the most recent path qualities, and such are used for the initial path selection of a session. Subsequent path selections can be based on health version changes (e.g., to avoid path flapping). Health version changes (e.g., version value as similarly described above) will potentially trigger the path selection logic. The path monitor does not advance the health version if the health measurement change is within the tolerance (e.g., configured sensitivity setting). The tolerance is derived from the sensitivity configuration in the path quality profile (e.g., 5% for high sensitivity, 10% for medium sensitivity, 15% for low sensitivity). For example, if a profile has maximal latency of 150 ms, and the sensitivity is high, then the path monitor will not change the version if the latency fluctuates between 0 and 150 ms. If the latency is measured at 151 ms, then the path monitor will advance the health version by 1. From that point on, the version will only be updated if the latency fluctuates outside of the range between 143 and 159, which is 5% of 151 ms.

Figure 12:
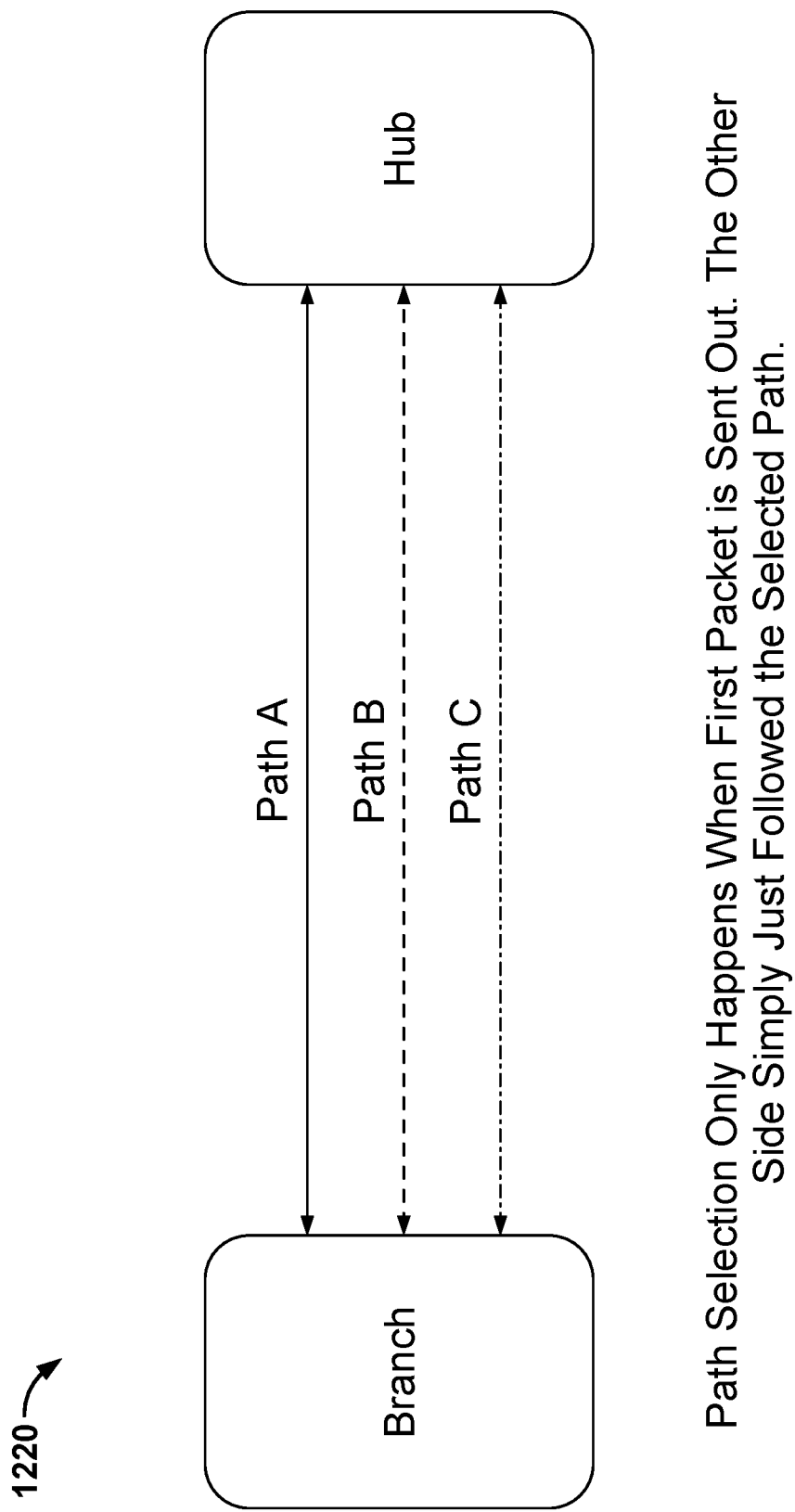
FIGS. 12A and 12B illustrate different path selections using enhanced SD-WAN path quality measurement and selection in accordance with some embodiments.

FIGS. 12A and 12B illustrate different path selections using enhanced SD-WAN path quality measurement and selection in accordance with some embodiments.

Referring to FIG. 12A, SD-WAN single-sided path quality measurement is illustrated at 1210. For example, for Path A, from X to Y: a+b+c+d is measured, and from Y to X: c+d+a+b is measured. As such, the disclosed techniques can be efficiently performed to only measure network path quality from the branch side thereby saving computing resources of the hub (e.g., the hub typically would have many more links/network paths than the branch office) as similarly described above.

Referring to FIG. 12B, SD-WAN path symmetric return is illustrated at 1220. For example, a path selection is performed when a first packet is sent out from the VIF. As such, the other side is configured to follow that selected network path as similarly described above.

Example processes for enhanced SD-WAN path quality measurement and selection will now be described below.

Example Processes for Enhanced SD-WAN Path Quality Measurement and Selection

Figure 13:
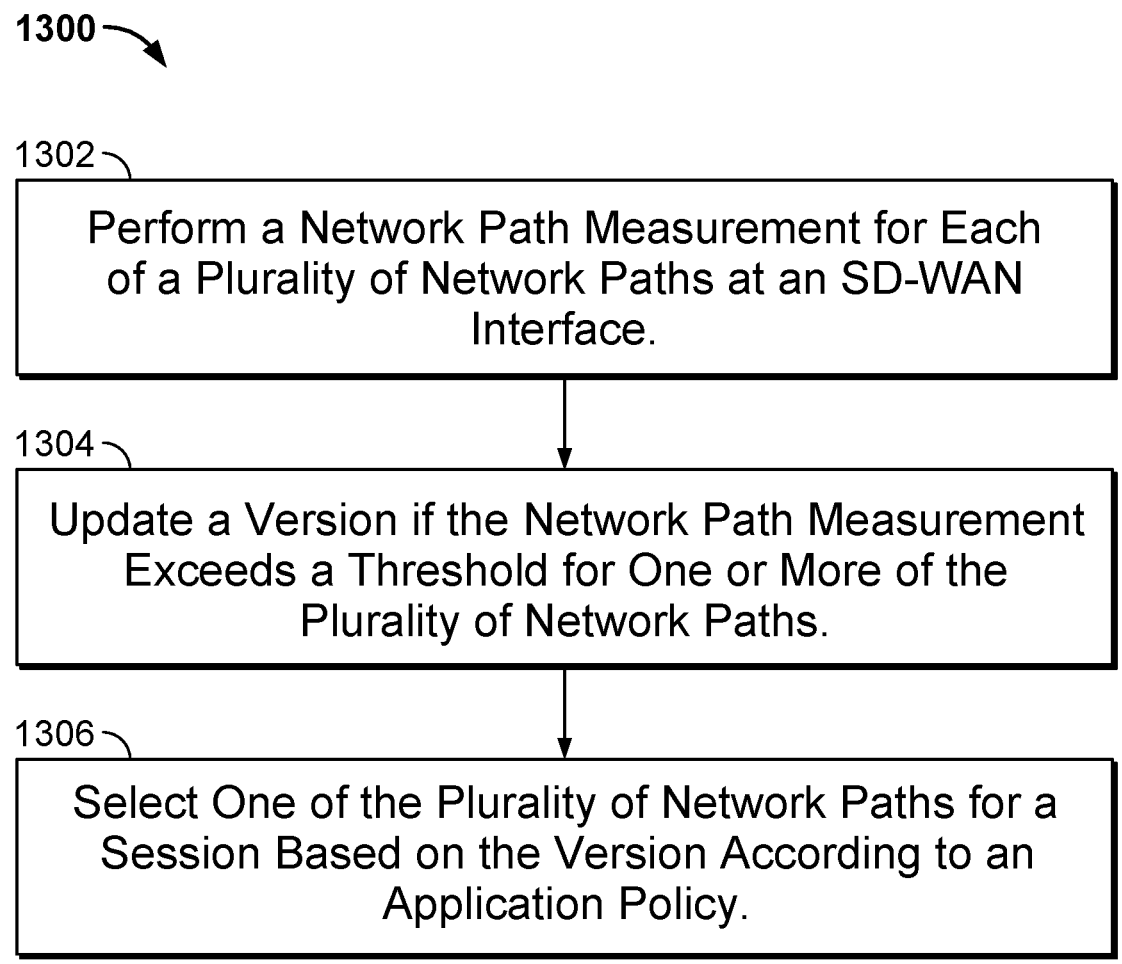
FIG. 13 is a flow diagram illustrating a process for enhanced SD-WAN path quality measurement and selection in accordance with some embodiments.

FIG. 13 is a flow diagram illustrating a process for enhanced SD-WAN path quality measurement and selection in accordance with some embodiments. In one embodiment, process 1300 is performed using the system architectures described above (e.g., such as described above with respect to FIGS. 1-12B).

The process begins at 1302 when a network path measurement is performed for each of a plurality of network paths at a Software-Defined Wide Area Network (SD-WAN) interface.

At 1304, a version is updated if the network path measurement exceeds a threshold for one or more of the plurality of network paths. For example, applications can be associated with different thresholds (e.g., and sensitivity settings) based on an application policy as similarly described above.

At 1306, one of the plurality of network paths is selected for a session based on the version according to an application policy.

Figure 14:
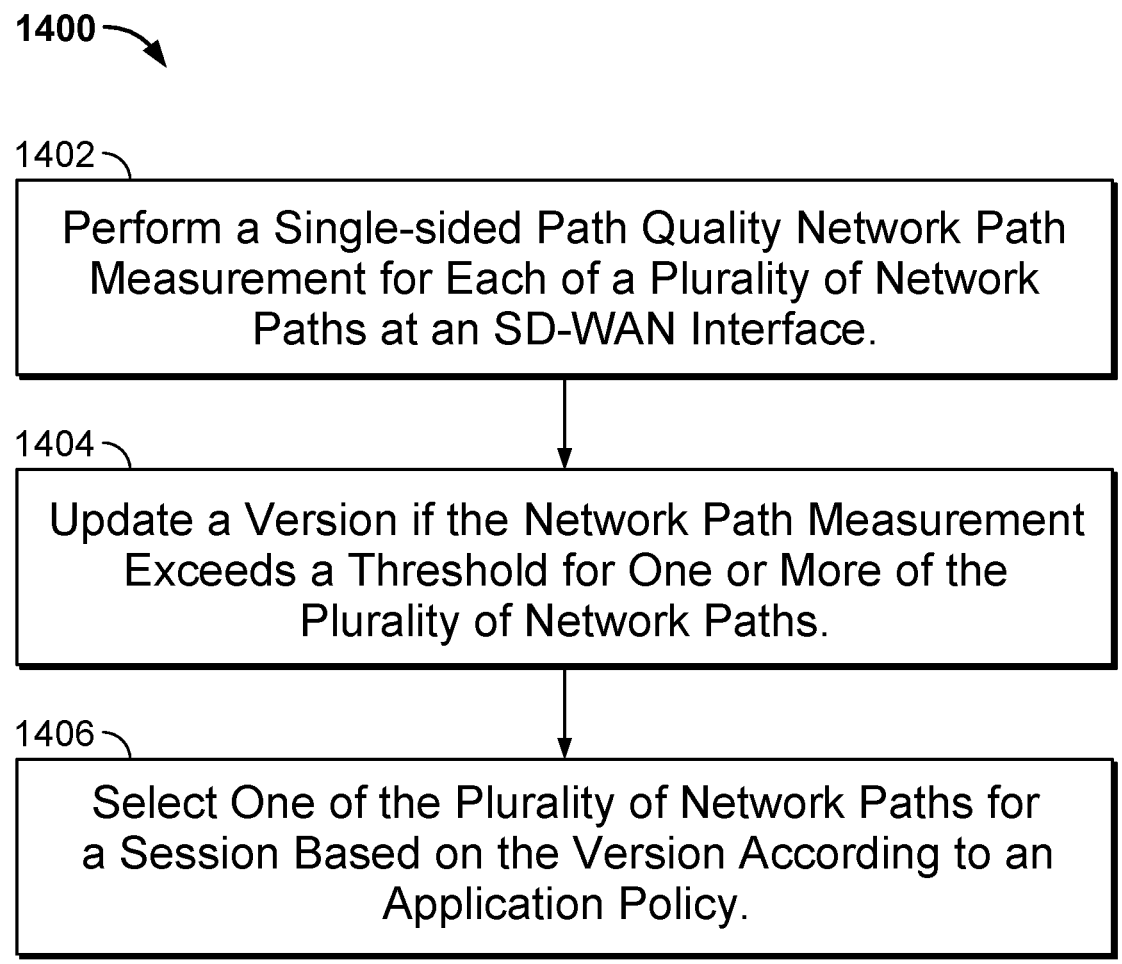
FIG. 14 is another flow diagram illustrating a process for enhanced SD-WAN path quality measurement and selection in accordance with some embodiments.

FIG. 14 is another flow diagram illustrating a process for enhanced SD-WAN path quality measurement and selection in accordance with some embodiments. In one embodiment, process 1400 is performed using the system architectures described above (e.g., such as described above with respect to FIGS. 1-12B).

The process begins at 1402 when a single-sided path quality network path measurement is performed for each of a plurality of network paths at a Software-Defined Wide Area Network (SD-WAN) interface.

At 1404, a version is updated if the network path measurement exceeds a threshold for one or more of the plurality of network paths. For example, a sensitivity setting can also be utilized to determine whether or not to increment the version based on the network path measurements.

At 1406, one of the plurality of network paths is selected for a session based on the version according to an application policy.

Figure 15:
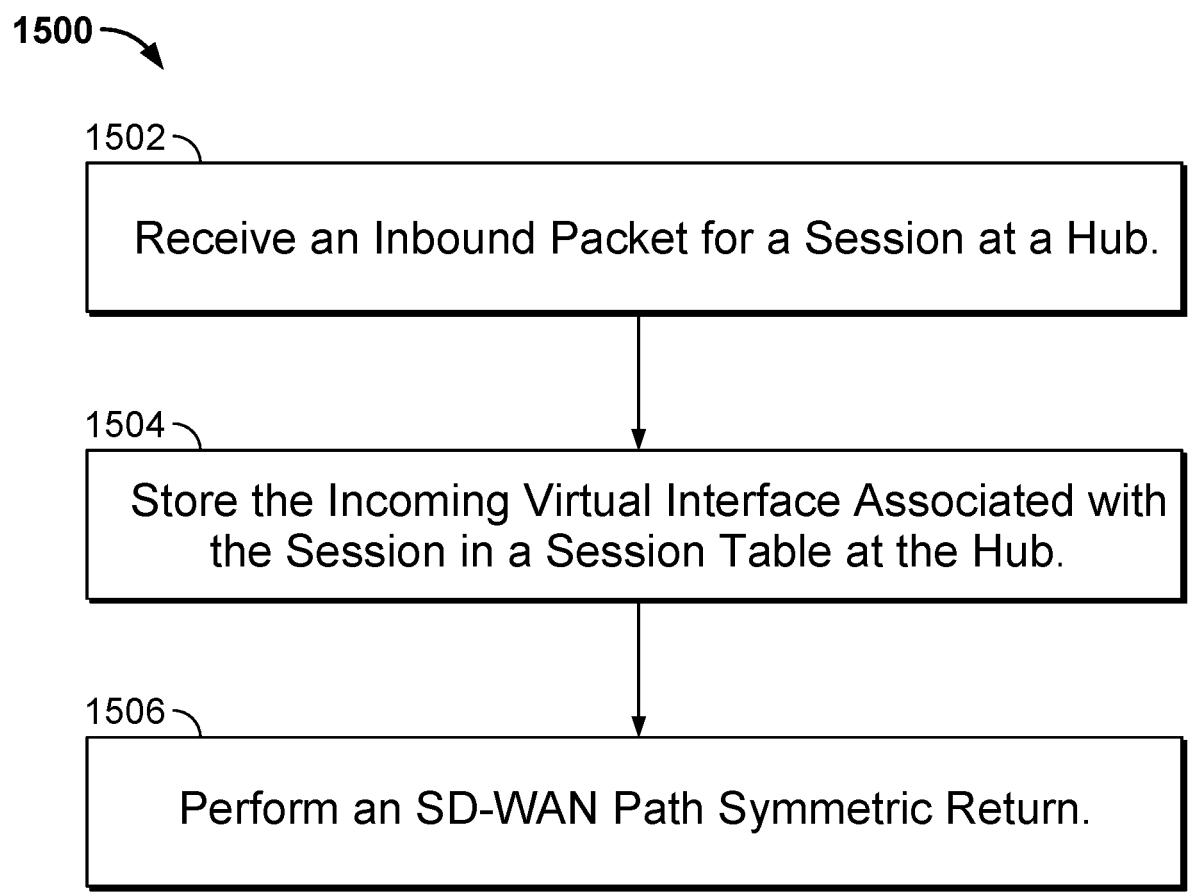
FIG. 15 is another flow diagram illustrating a process for enhanced SD-WAN path quality measurement and selection in accordance with some embodiments.

FIG. 15 is another flow diagram illustrating a process for enhanced SD-WAN path quality measurement and selection in accordance with some embodiments. In one embodiment, process 1500 is performed using the system architectures described above (e.g., such as described above with respect to FIGS. 1-12B).

The process begins at 1502 when an inbound packet for a session is received at a hub.

At 1504, the incoming virtual interface associated with the session is stored in a session table at the hub. For example, an example session table stored at the hub is shown in FIG. 1 as similarly described above.

At 1506, an SD-WAN path symmetric return is performed. In this example, the hub uses the same virtual interface for the return traffic for that session as similarly described above.

Figure 16:
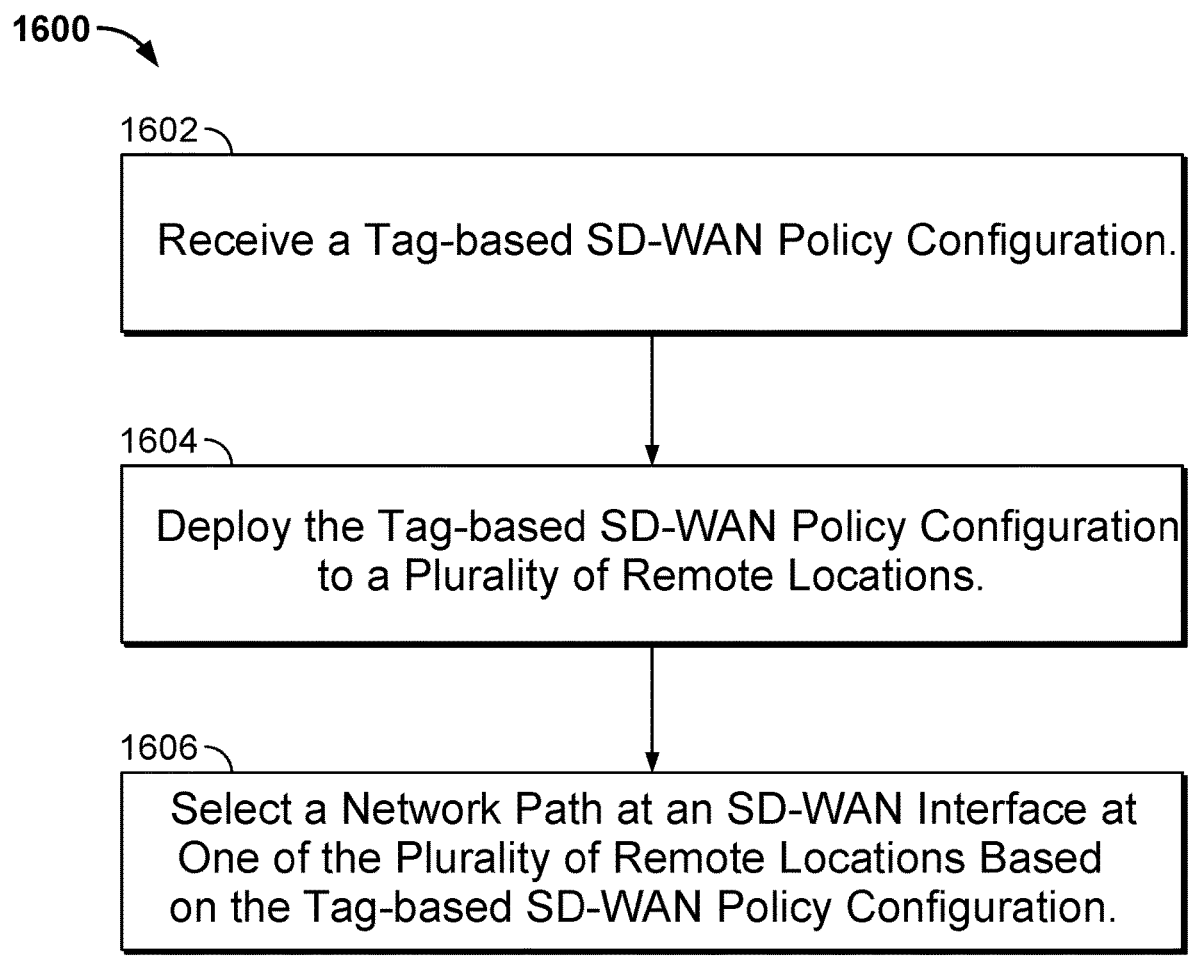
FIG. 16 is another flow diagram illustrating a process for enhanced SD-WAN path quality measurement and selection in accordance with some embodiments.

FIG. 16 is another flow diagram illustrating a process for enhanced SD-WAN path quality measurement and selection in accordance with some embodiments. In one embodiment, process 1600 is performed using the system architectures described above (e.g., such as described above with respect to FIGS. 1-12B).

The process begins at 1602 when a tag-based Software-Defined Wide Area Network (SD-WAN) policy configuration is received. For example, each link of the SD-WAN interfaces can be configured with a tag to facilitate more efficient SD-WAN policy configurations for remote locations (e.g., branch offices, hubs, etc.) as similarly described above.

At 1604, the tag-based SD-WAN policy configuration is deployed to a plurality of remote locations. For example, the tag-based SD-WAN policy configuration is pushed to the remote branch office devices and hub devices as similarly described above.

At 1606, a network path at an SD-WAN interface at one of the plurality of remote locations is selected based on the tag-based SD-WAN policy configuration.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system comprising:
   a processor configured to:
      periodically perform a network path measurement for each of a plurality of network paths at a Software-Defined Wide Area Network (SD-WAN) interface;
      detect whether the network path measurement exceeds a threshold for one or more of the plurality of network paths and update a version that corresponds to an updated version wherein the version is an integer value that is associated with a first set of path quality measurements at a first time, wherein a network path quality comparison is performed by comparing two integer values based on a comparison of two distinct versions including the updated version that is associated with path quality measurements performed at the first time and a previous version that is associated with path quality measurements performed at another time earlier than the first time, and wherein the version is broadcast by a network path monitoring unit; and
      select one of the plurality of network paths for a session based on the version according to an application policy, and in an event that there is no change of the version associated with a selected network path, then network path selection logic is bypassed to reduce consumption of computing and memory resources; and
   a communication interface coupled to the processor and configured to provide the processor with instructions.

2. The system of claim 1, wherein performing the network path measurement further comprises sending probe packets from the SD-WAN interface.

3. The system of claim 1, wherein the one of the plurality of network paths comprises a link or a tunnel.

4. The system of claim 1, wherein the threshold comprises an application-based threshold for a first application type, and wherein the session is associated with the first application type.

5. The system of claim 1, wherein the network path measurement is performed for one side of a roundtrip path selection.

6. The system of claim 1, wherein the application policy includes a hierarchy of preferred paths per application type.

7. The system of claim 1, wherein the application policy includes a sensitivity threshold for performing network path measurements per application type.

8. The system of claim 1, wherein the session is a new session.

9. The system of claim 1, wherein the session is an existing session.

10. The system of claim 1, wherein selecting the network path for the session based on the version further comprises selecting the one of the plurality of network paths for the session based on a best available, top down priority, and/or a weighted session distribution.

11. The system of claim 1, wherein an SD-WAN policy includes a plurality of SD-WAN rules for a plurality of SD-WAN interfaces based on the application policy.

12. The system of claim 1, wherein an SD-WAN policy includes a plurality of SD-WAN rules for a plurality of SD-WAN interfaces based on the application policy, and wherein the processor is further configured to:
perform a match with the SD-WAN policy by determining if a network path quality profile matches an SD-WAN rule.

13. The system of claim 1, wherein the version is incremented based on a sensitivity value that is configured per application type.

14. A method comprising:
periodically performing a network path measurement for each of a plurality of network paths at a Software-Defined Wide Area Network (SD-WAN) interface using a processor;
detecting whether the network path measurement exceeds a threshold for one or more of the plurality of network paths and updating a version that corresponds to an updated version wherein the version is an integer value that is associated with a first set of path quality measurements at a first time, wherein a network path quality comparison is performed by comparing two integer values based on a comparison of two distinct versions including the updated version that is associated with path quality measurements performed at the first time and a previous version that is associated with path quality measurements performed at another time earlier than the first time, and wherein the version is broadcast by a network path monitoring unit; and
selecting one of the plurality of network paths for a session based on the version according to an application policy, and in an event that there is no change of the version associated with a selected network path, then network path selection logic is bypassed to reduce consumption of computing and memory resources.

15. The method of claim 14, wherein performing the network path measurement further comprises sending probe packets from the SD-WAN interface.

16. The method of claim 14, wherein the one of the plurality of network paths comprises a link or a tunnel.

17. The method of claim 14, wherein the threshold comprises an application-based threshold for a first application type, and wherein the session is associated with the first application type.

18. The method of claim 14, wherein an SD-WAN policy includes a plurality of SD-WAN rules for a plurality of SD-WAN interfaces based on the application policy, further comprising:
performing a match with the SD-WAN policy by determining if a network path quality profile matches an SD-WAN rule.

19. The method of claim 14, wherein the version is incremented based on a sensitivity value that is configured per application type.

20. A non-transitory computer readable medium, comprising computer readable instructions, which when executed perform the following:
periodically performing a network path measurement for each of a plurality of network paths at a Software-Defined Wide Area Network (SD-WAN) interface;
detecting whether if the network path measurement exceeds a threshold for one or more of the plurality of network paths and update a version that corresponds to an updated version wherein the version is an integer value that is associated with a first set of path quality measurements at a first time wherein a network path quality comparison is performed by comparing two integer values based on a comparison of two distinct versions including the updated version that is associated with path quality measurements performed at the first time and a previous version that is associated with path quality measurements performed at another time earlier than the first time, and wherein the version is broadcast by a network path monitoring unit; and
selecting one of the plurality of network paths for a session based on the version according to an application policy, and in an event that if there is no change of the version associated with a selected network path, then network path selection logic is bypassed to reduce consumption of computing and memory resources.

21. The computer readable medium of claim 20, wherein performing the network path measurement further comprises sending probe packets from the SD-WAN interface.

22. The computer readable medium of claim 20, wherein the one of the plurality of network paths comprises a link or a tunnel.

23. The computer readable medium of claim 20, wherein the version is incremented based on a sensitivity value that is configured per application type.

* * * * *